Nov. 4, 1969   R. M. VAUGHN   3,476,165
CAPTURED PANEL FASTENER
Filed May 28, 1968
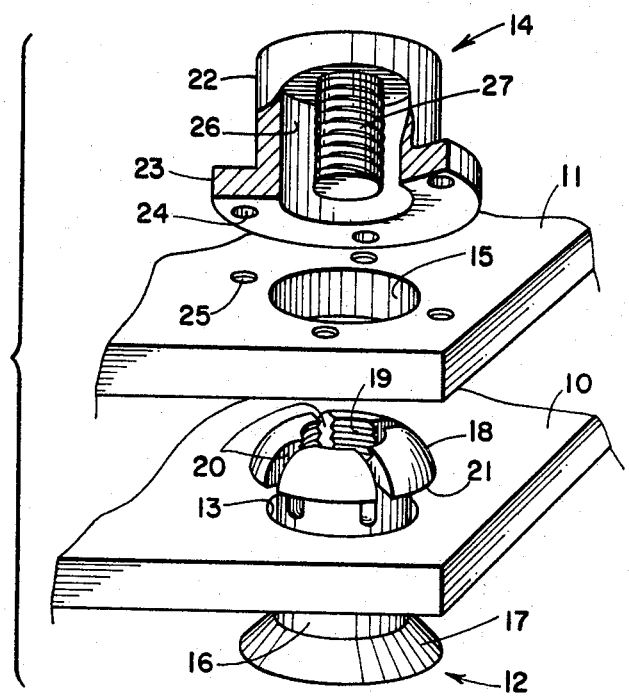
FIG. 1
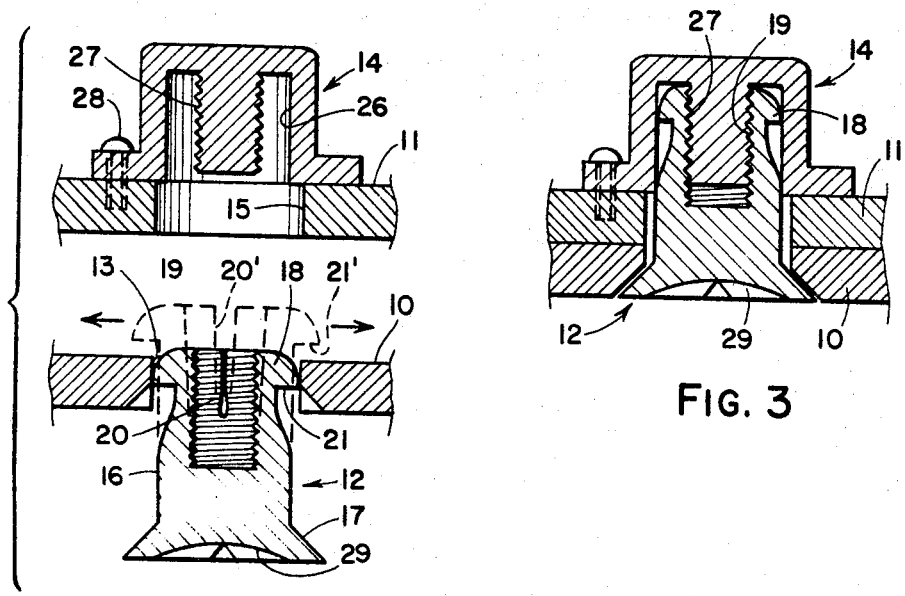
FIG. 2
FIG. 3
INVENTOR:
RUDOLPH MARION VAUGHN
BY
Elliott & Pastoriza
ATTORNEYS United States Patent Office 3,476,165
Patented Nov. 4, 1969

3,476,165
CAPTURED PANEL FASTENER
Rudolph Marion Vaughn, 2172 Salt Air Drive,
Santa Ana, Calif. 92705
Filed May 28, 1968, Ser. No. 732,674
Int. Cl. F16b *43/00, 33/04, 13/04*
U.S. Cl. 151—69                                    1 Claim

ABSTRACT OF THE DISCLOSURE

The bolt portion of a panel fastener assembly is provided with a radially extending annular lip about its shank. The shank itself is counterbored and interiorally threaded for threaded engagement with an exteriorally threaded stud on a wall portion against which the panel closes. This counterbore is axially slotted such that the annular lip may circumferentially contract to permit the bolt to be passed through an opening in the panel preparatory to threading the same on the wall stud. After passing through the panel, the annular lip portion will expand and overlie the peripheral edge opening in the panel and thus hold the bolt captured to the panel.

---

This invention relates generally to fasteners and more particularly to an improved fastener assembly for securing panels and the like over access openings.

Background of the invention

Panel fasteners for aircraft cowlings, covering for various access openings, and the like are well known in the art. Generally, these fasteners are similar to the type shown in one of the embodiments of my United States Patent 3,378,054 issued Apr. 16, 1968. In this fastener, there is provided a bolt member for passing through an opening in a panel and including a counterbored end which is interiorally threaded. This threaded end in turn is arranged to be threaded over an exteriorally threaded stud member constituting a projection within a cylindrical body of more or less hat shape in cross section. This body is secured to a stationary wall portion against which the panel is to be closed and by incorporating this particular structure, the threads of the bolt are protected as a consequence of the interior threaded arrangement.

In the particular species of the fastener referenced in my above-identified patent, the counterbored portion of the bolt is axially slotted to permit circumferential contraction of the interior bore and interior threads. The hat shaped body within which the bolt is received in turn includes tapered interior wall portions which function to circumferentially contract the bolt end as the same is urged into the hat shaped receiving structure. By this arrangement, the bolt may be inserted into the "nut" or hat shaped receiving structure a considerable distance before the threads are contracted sufficiently to engage the mating threads on the stud. As a result, only a few turns are necessary to secure the panel in position.

In fasteners of the foregoing type as well as other fasteners, it is normally required that various grades or sizes of fasteners be available depending upon strength requirements of the panel fastening and similar considerations. Thus, only a particular type of bolt will be threadedly engageable with a particular type of receiving nut or threaded stud structure. Normally, the threaded stud structure or similar hat shaped element is secured to the rear wall portion and exposed through an opening in the structure against which the panel is to be closed in a more or less permanent position. The panel bolts are then passed through openings in the panel to engage the nuts. Of course, it is possible that the wrong bolt or improper sized bolt will be inserted through the panel opening since the nut receiving structure is disposed to the rear of the wall and only receives the bolt through the opening in the wall. It is thus not possible to determine at a glance whether or not the correct bolt is being used.

As a result of the foregoing, it is common practice to provide a suitable means for capturing the correct bolt size for the fastener to the panel opening. Such a capturing of the bolt to the panel opening requires some type of radially extending or enlarged portion on the bolt shank which will overlie the periphery of the panel opening and thus hold the bolt to the panel. However, radially extending portions from the bolt shank which would overlie the panel opening would normally prevent complete closure of the panel in flush surface engaging arrangement with the wall. It has therefore been necessary to recess the inner surface of the panel adjacent to the panel opening to accommodate a radially extending portion of the bolt shank or an arc type washer fitted within a groove in the bolt such as a conventional locking washer to hold the bolt captive to the panel.

Recessing or machining out an area about the periphery of the panel opening will necessarily result in a weakening of the panel fastening assembly since the very point at which the panel is held to the wall is of less thickness compared to the remaining panel structure. In addition, such a machining operation increases the overall cost in the manufacture of such panels.

Brief summary of the present invention

The present invention overcomes the above noted difficulties by providing a novel bolt portion for the panel fastener assembly. More particularly, the bolt constitutes a shank terminating at one end in an enlarged head and at its other end in a counterbored position which is interiorally threaded. To this extent the bolt is similar to bolts presently being used. However, in accord with the invention the shank portion adjacent the counterbored end includes an annular radially extending lip having a smoothly rounded forward surface and a flat under surface substantially at right angles to the surface of the shank. This lip together with the wall defining the counterbore is axially slotted in such a manner that circumferential contraction of the lip can take place to an extent such that the outside diameter of the lip is no greater than the diameter of the major portion of the shank.

With the foregoing arrangement, the bolt may be passed through the panel opening, the opening itself camming against the forward curved portion of the lip to contract the slotted counterbore and after passing through the panel opening, this portion will expand back to its normal position so that the lip overlies the periphery of the panel opening. The bolt is thus captured to the panel. The same flexibility insofar as circumferential contraction is concerned permits the bolt to then be fitted to the threaded stud of the nut portion of the fastener, the cylindrical receiving area coaxially surrounding the threaded stud serving again to contract the lip to a diameter corresponding to that of the shank so that complete tightening of the bolt onto the stud can be effected and there is complete fact-to-face engagement of the inner panel surface with the wall portion.

It will be evident that with the foregoing arrangement, there is no necessity whatsoever for performing any additional machining operations on the panel which might weaken the same. Further, with the bolts captured to the panels themselves, there is no possibility of subsequently losing the bolt or substituting a wrong sized bolt in attempting to close the panel in fastened relationship.

Brief description of the drawings

A better understanding of the invention will be had by now referring to the accompanying drawings, in which:

FIGURE 1 is a fragmentary exploded view partly broken-away illustrating the panel fastener assembly and portions of a panel and wall against which the panel is to be closed;

FIGURE 2 is a fragmentary cross section of the various components of FIGURE 1 but illustrating an initial step in securing a bolt to the panel; and, FIGURE 3 is a cross section of the panel fastener in assembled closed or secured relationship.

Detailed description of the preferred embodiment

Referring first to FIGURE 1 there is shown a portion of a panel 10 adapted to close against a wall portion 11 which might constitute a marginal edge portion of an access opening. The fastener itself includes a bolt designated generally by the numeral 12 arranged to pass through an opening 13 in the panel portion 10, and a nut structure indicated generally by the numeral 14 arranged to cover an aligned opening 15 on the rear surface of the wall portion 11.

Referring now in detail to the bolt 12, this member comprises a cylindrical shank portion 16 terminating at one end in an enlarged head 17 and at its other end in a radially extending annular lip 18. As shown, this other end of the shank includes an interiorly threaded counterbore 19 extending axially into the shank 16. The shank walls defined by the counterbore structure and annular lip 18 are axially slotted such as indicated at 20. Preferably four such slots are provided and extend a given axial distance along the shank.

It will be noted that the annular lip 18 has a smoothly rounded forward surface and a substantially flat rear or under surface 21. The outside diameter of the lip 18 in the position illustrated in FIGURE 2 is greater than the outside diameter of the shank 16 beyond the given axial distance of the slots. The diameter of the panel opening 13 on the other hand is intermediate the diameter of the lip 18 and shank 16. It will be evident accordingly that when the bolt is in the position illustrated in FIGURE 1, it is captured to the panel 10.

Referring now to the nut assembly 14, there is provided an annular body 22 which may be of cylindrical shape terminating in a radially extending flange 23 such as to define a generally hat shape configuration. The flange 23 includes suitable openings such as indicated at 24 for registration with openings 25 in the wall portion 11 so that suitable fasteners may be passed into the openings to secure or couple the nut 14 to the rear of the wall 11 in a position coaxial with the wall opening 15.

The interior annular wall surface 26 of the nut 14 coaxially surrounds a threaded stud 27. These threads are arranged to mate with the interior threaded portion 19 of the bolt when the bolt is received within the nut structure all as will become clearer as the description proceeds.

Referring now to FIGURE 2, a rivet 28 is shown passing through the opening on the flange of the nut member 14 and into the wall 11. The diameter of the opening 24 in the flange shown in FIGURE 1 is slightly larger than the diameter of the fastening rivet 28. By this arrangement, the nut can move laterally a small distance and is losely coupled to the wall 11. This small degree of movement is desirable to permit lining up exactly of the stud 27 when threadedly received within the counterbored portion 19 of the bolt.

Referring to the lower portion of FIGURE 2, the bolt 12 is illustrated in the position it will assume when being inserted through the opening 13 in the panel number 10. Because the diameter of the opening 13 is slightly smaller than the external diameter of the lip 18 when the latter is in the position illustrated in FIGURE 1, a circumferential contraction of the annular lip s necessary to pass the bolt through the opening. This contraction is permitted by the axial directed slots 20 describing FIGURE 1, the design being such that the annular lip can contract to a diameter substantially corresponding to the diameter of the remaining portion of the shank 16.

Thus, the forward rounded surface of the lip 18 will first engage the periphery of the opening 13 and the lip will thus be cammed to circumferentially contract. When the lip is completely through the opening 15, it is free to expand outwardly as indicated by the arrows and by the dotted line position shown. In this position, as already described in FIGURE 1, it will be evident that the bolt is captured to the panel.

FIGURE 3 illustrates the relative positions of the fastener parts when the panel is completely closed and locked to the wall. In this view, it will be evident that in securing the panel the lip 18 has again circumferentally contracted by the inner cylindrical walls of the nut 14 so that the threads 19 and 20 will mate and secure fastening results.

The head of the bolt 16 may include a high torque recessed slot 29 so that torquing of bolt to complete the fastening can be achieved with a high torque driver.

Operation

The operation of this invention will be evident from the foregoing description. Initially, suitable bolts corresponding in size to the associated nuts such as the nut 14 are provided for a panel and these bolts may be initially urged through the panel opening such as described in conjunction with FIGURE 2. The bolts are thus captured to the panels and will always remain with the panels whether the panels are in open or closed position.

When it is desired to close a panel, it is only necessary to urge the forward end of the bolt defined by the forward rounded portion of the lip 18 through the wall opening 15 and thence into the nut structure 14.

The "floating" mount for the nut 14 to the rear wall 11 will permit slight lateral movement of the nut so that the same will center properly to coaxially receive the threaded counterbore 19. It should be noted in this respect that the interior threads of the counterbore are radially expanded so that they can readily be received over the threads 27 of the stud. Iinward pressure of the bolt then result in the curved forward surface of the annular lip 18 being cammed radially inwardly by the entrance of the cylindrical interior wall 26 of the nut 14 to thereby circumferentially contract the threads about the threads of the threaded stud and complete threading can then be carried out so that the bolt will assume the position illustrated in FIGURE 3.

It will be noted in the embodiment described that the inner cylindrical wall 26 of the nut 14 is actually cylindrically shaped so that essentially the bolt must be completely threaded onto the stud once the lip 18 has initially entered this cylindrical area. It should be born in mind, however, that the interior cylindrical wall 26 could be tapered slightly so that a major portion of the initial threads 19 will bypass the exterior threads 27 of the stud and only when the annular lip 18 engages the reduced diameter tapered portion of the inner cylindrical wall 26 will sufficient circumferential contraction take place to engage the threads. Thereafter, only a few turns would be necessary. This latter arrangement would then be substantially as described in my referred to above patent.

In many operations, however, it is less expensive to simply machine a cylindrical interior wall surface such as shown in 26 and therefore the feature of a rapid threading assembly may or may not be incorporated.

It will be noted from FIGURE 3 that the panel surface 10 is flush with the panel surface 11 to provide the desired secure fastening and that no recessing of the panel is necessary to accommodate the capturing portion of a bolt.

From the foregoing description, it will be evident that the present invention has provided a greatly improved bolt portion for a panel assembly wherein all of the advantages of a captured bolt are realized without any of the heretofore mentioned disadvantages involved in providing such an arrangement.

What is claimed is:
1. A fastener for securing a removable panel to a wall portion comprising, in combination:
(a) a bolt member having a cylindrical shank terminating at one end in an enlarged head and at its other end in a radially extending lip defining an increased diameter over that of the main portion of said shank, said lip
  (1) having a sloping front surface and
  (2) an annular flat rear surface at substantially right angles to said shank, said shank further including
  (3) a counterbore passing into said shank a given distance,
  (4) said counterbore being interiorally threaded,
  (5) a given axial length of the side wall of said lip and counterbore being slotted such that said bore may be circumferentially and resiliently contracted in size under force to a decreased given interior diameter wherein said increased diameter of said lip is reduced to correspond to the exterior diameter of said shank beyond said given axial length, whereby said bolt may be readily urged through a panel opening in said removable panel having a diameter intermediate the diameter of said shank and the diameter of said lip, said lip circumferentially contracting by camming action of said panel opening and thence circumferentially expanding after passing through said panel opening such that said annular flat rear surface overlies the periphery of said panel opening so that said bolt is captured by said panel; and

(b) a nut member on said wall portion comprising an annular body having an open end and peripherally extending flange to define a hat shape;
  (1) a threaded stud coaxially positioned within said body for threaded engagement with said counterbore of said bolt when said flange of said nut member is secured over an opening in said wall portion aligned with said panel opening when said panel is in closed position;
  (2) the inner diameter of said annular body corresponding substantially to said exterior diameter of said shank so that the inner wall surface of said body cams said lip towards a reduced diameter when said bolt is threaded onto said stud thereby assuring reliable mating of said interior threads with said threaded stud and permitting said panel surface to be in face-to-face engagement with said wall portion.

References Cited

UNITED STATES PATENTS

| | | | |
|---|---|---|---|
| 1,978,935 | 10/1934 | Douglas | 85—80 |
| 2,649,884 | 8/1953 | Westover | 85—80 |
| 3,289,726 | 12/1966 | Sauter | 151—69 |

FOREIGN PATENTS 914,063  12/1962  Great Britain.

EDWARD C. ALLEN, Primary Examiner

U.S. Cl. X.R.

85—1, 80; 151—41.7